Feb. 17, 1970  A. F. PLANT  3,496,068
SWEEP DISTILLATION APPARATUS
Filed Sept. 8, 1966  3 Sheets-Sheet 1

INVENTOR
ALBERT F. PLANT
BY *James and Franklin*
ATTORNEY

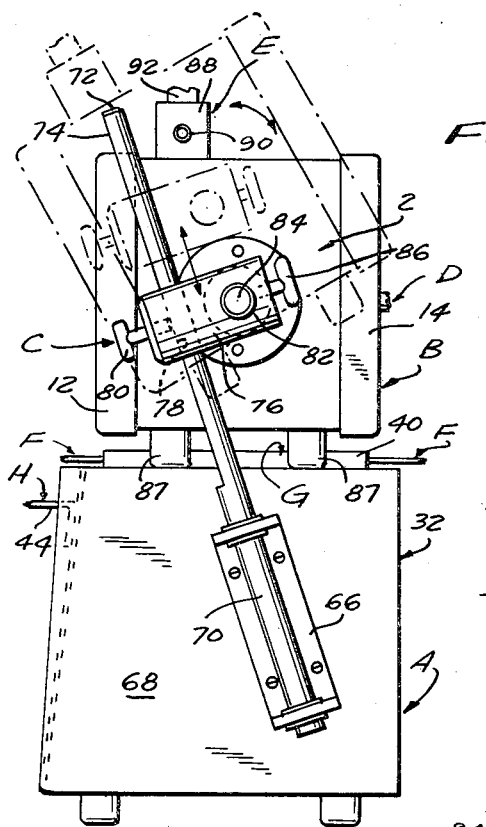
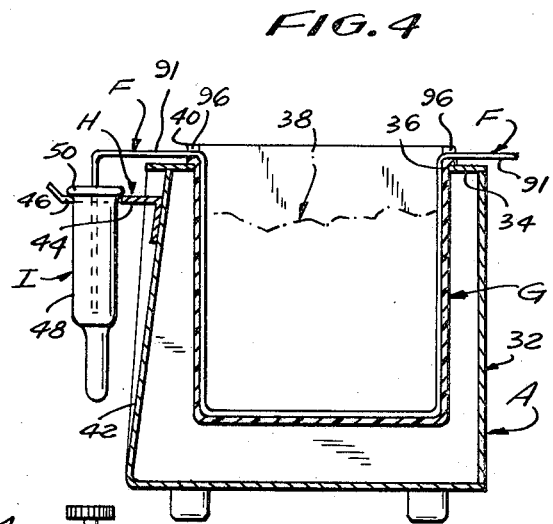
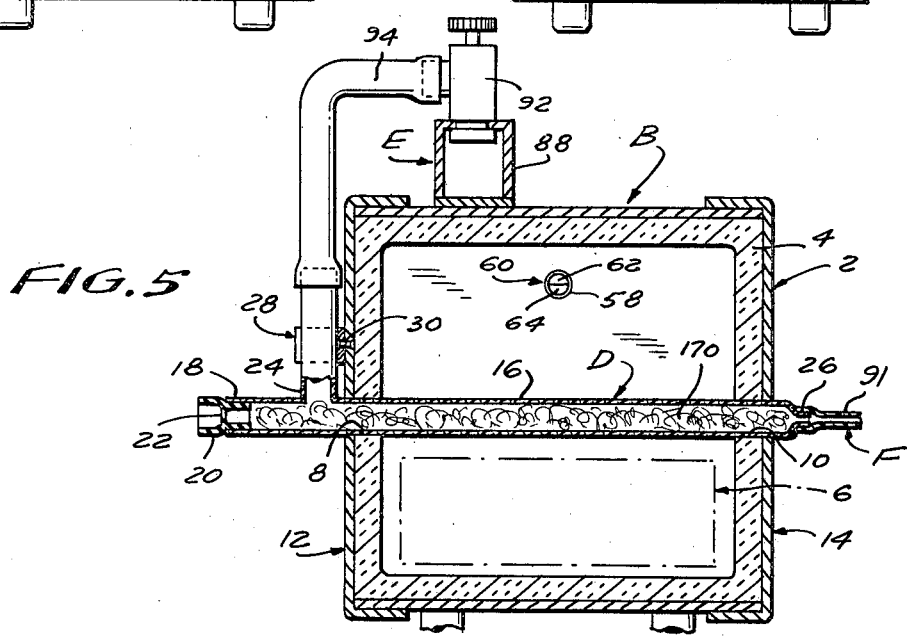

Feb. 17, 1970     A. F. PLANT     3,496,068
SWEEP DISTILLATION APPARATUS

Filed Sept. 8, 1966     3 Sheets-Sheet 3

INVENTOR
ALBERT F. PLANT
BY *James and Franklin*
ATTORNEY

3,496,068
SWEEP DISTILLATION APPARATUS
Albert F. Plant, Vineland, N.J., assignor to Kontes Glass Company, Vineland, N.J., a firm composed of William Kontes, James Kontes, and Nontas Kontes
Filed Sept. 8, 1966, Ser. No. 578,050
Int. Cl. B01d 3/02
U.S. Cl. 202—172                6 Claims

ABSTRACT OF THE DISCLOSURE

Sweep distillation apparatus provided with a heated chamber through which gas-conducting tubes pass, the tubes being removably secured to the chamber; the heating chamber is adjustably mounted on a support so as to be movable up and down and be rotatable about an axis substantially perpendicular to the axis of said tubes; the support carries a container for condensing material and means for holding a receptacle, a conduit being adapted to extend from the outlet and of the tube through said container to a receptacle adapted to be mounted on the apparatus.

---

The present invention relates to apparatus for facilitating the carrying out of sweep distillation procedures, and is particularly well adapted for use in connection with that type of distillation known as co-distillation. The term "distillation" as here used is inclusive of co-distillation.

Sweep distillation is a procedure by means of which a specimen is subjected to heat sufficient to distill off components having appropriate boiling points and a flow of gas is passed over the specimen to remove or sweep away the distilled vapors and carry them to a station where they are condensed and recovered, the sweeping gas then escaping. This type of procedure has proved to be extremely efficacious in various chemical analyses, particularly where some of the components which are distilled off are present in extremely small quantities or proportions. The method is at present widely used in connection with pesticide analysis using gas chromatography; specimens of foodstuffs are subjected to the sweep distillation procedure in order to separate therefrom any pesticide residues which might be present therein, and the distillate is then analyzed to determine its composition and quantity. However, sweep distillation may also be used in many other applications.

It is, of course, essential, particularly when sweep distillation is used in conjunction with composition analysis, that the various portions of the distilling apparatus be completely clean, for otherwise they would contaminate the distillation results and give rise to inaccurate analyses. With conventional sweep distillation apparatus this presents a very significant problem. The sweep distillation is carried out within a container, normally in the form of a glass tube, which is wholly or partially filled with a body of readily permeable inert substance such as borosilicate glass wool, the sample particulates and impurities being retained by the glass wool and the sweeping gas flowing through the glass wool body and hence passing over the sample. After one distillation procedure has been carried out, it is necessary that the distilling tube be thoroughly cleaned and a fresh supply of glass wool inserted therein before the next procedure can be carried out. This is time-consuming, in part because of the geometry of the tubes and in part because those tubes were either not removable from the oven with which they were associated or else were removable therefrom only with great difficulty. Obviously, the equipment could not be used during the time that the tubes which formed a part thereof were being cleaned, and hence the equipment was inefficient from a production point of view.

Moreover, sweep distilling tubes of different effective lengths are desired for different analytic problems. For example, when materials such as fats and oils are involved, a longer tube is needed in order to prevent the heavy polymeric residues from being swept out along with the distillate. Using tubes of different lengths can also assist in separating high boiling point materials from low boiling point materials. It is of course necessary in such situations that the entire operative tube length be subjected to distilling temperatures. Prior art apparatus was not adaptable to this end.

In general, the apparatus of the prior art which has been employed for sweep distillation procedures has not been specially designed with that procedure in mind, but instead has been made up on an ad hoc basis from elements and parts which were available in the laboratory, and which had ben designed with specifically different procedures in mind.

It is the prime object of the present invention to devise a distillation apparatus specially designed for sweep distillation procedures, thereby to permit the carrying out of such procedures efficiently and accurately. More specifically, it is an object of the present invention to devise such an apparatus in which (a) the parts in contact with the specimen and the distillate can be readily cleaned, (b) the down-time of the equipment by reason of cleaning is made virtually zero. (c) distilling tubes of standard length can be so manipulated as to have their effective operative length increased when desired without increasing their physical length and without requiring any modification of the standard apparatus employed, (d) closely and accurately controlled distillation conditions of temperature, rate of flow of sweep gas and the like are attained, (e) a plurality of sweep distillation procedures may be carried on simultaneously and independently or cooperatively, as desired, and (f) a simple, rugged, unitary structure capable of accomplishing all of the above objects is provided.

To these ends the apparatus of the present invention comprises a support and a heating chamber. The heating chamber, containing heating means designed to be accurately temperature-controlled by means of apparatus mounted on the support, is provided with one or more passages therethrough. Sweep distillation tubes of special design are removably received in those passages, preferably by merely being slid thereinto from one side of the heating chamber. Means are provided on the heating chamber for releasably grasping the tubes and holding them in position. Thus each tube, after it has been used, may readily be removed from the heating chamber and a fresh tube inserted in its place, the apparatus then being ready for a new sweep distillation test. The removed tube can be cleaned at any convenient time, without in any way delaying the useabiilty of the apparatus for subsequent procedures.

In the form specifically disclosed each of the distillation tubes is provided with an upwardly extending part which constitutes the inlet for the sweep gas, the tube-grasping means on the heating chamber engaging with this upwardly extending part in order to hold the tube in position. The tube end adjacent the upwardly extending gas inlet may be closed by a punctureable septum through which the specimen to be analyzed may be introduced into the tube. The other or gas-exit end of the tube is provided with means by which a conduit may be connected thereto.

Mounted on the support is a container adapted to contain a condensing substance such as ice or cold water. The conduits secured to the gas-exit ends of the tubes pass through this container, and hence the distilled contents thereof are condensed. The support is also provided with means for holding receptacles such as test tubes which are designed to collect the distilled and now condensed substances, the ends of the conduits being received within such receptacles.

Means are preferably provided for mounting a plurality of tubes in the heating chamber and for mounting a plurality of receptacles on the support. Hence a plurality of individual sweep distillation procedures can be carried out simultaneously or, if desired, the distillants from a plurality of distilling tubes can be led into a single receptacle.

The heating chamber is mounted on the support so as to be movable relative thereto, and in particular so as to be movable in such a fashion that the vertical inclination of the distilling tubes mounted therein can be varied. This has the result of altering the effective operative length of those tubes. When the tubes are horizontal they have a given effective operative length, but when they are inclined with their exit ends raised above their entrance ends, so that the sweep gas and the matter entrained therein must move upwardly, their effective operative lengths are increased. Hence by positioning the heating chamber relative to the support so that the distilling tubes carried thereby have a desired inclination, the effective operative length of those tubes may be varied without requiring any structural modification whatsoever in the apparatus itself.

By providing the heating chamber as a separate unit from the support therefor and from the distillation tubes themselves, repair and replacement of parts is greatly facilitated. In particular, that portion of the apparatus which is subjected to high temperatures, and which is for that reason most susceptible to damage or dislocation, is made separate from all of the other parts of the apparatus, so that it may more readily be replaced in the event of damage or malfunction.

The apparatus here specifically disclosed is sufficiently accurate so that recovery rates for pesticide residues of 90–99%, or even higher, may be realized, even when the pesticide is present in proportions as low as .025 parts per million in the sample.

To the accomplishment of the above, and to such other objects as may hereinafter appear, the present invention relates to the construction of a sweep distillation apparatus as defined in the appended claims and as described in this specification, taken together with the accompanying drawings, in which:

FIG. 3 is a side elevational view thereof taken from the right hand side of FIG. 1;

Figure 1:
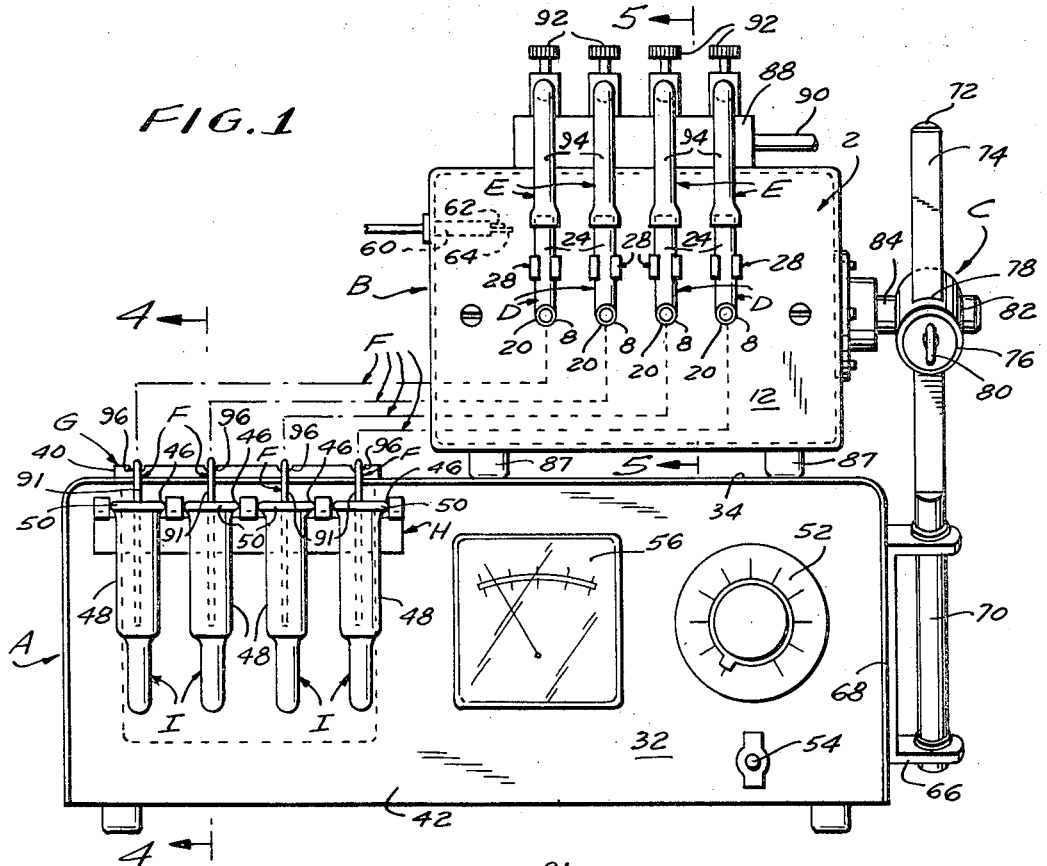
FIG. 1 is a front elevational view of a preferred embodiment of the present invention.
Figure 6:
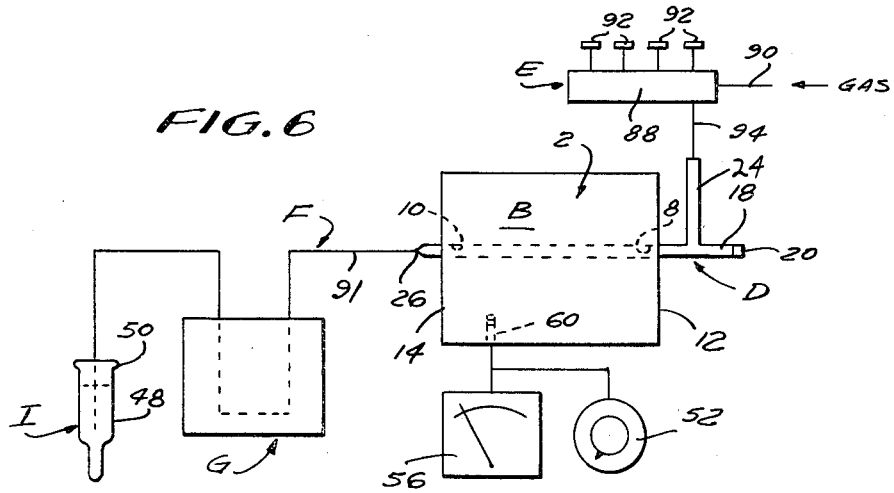

FIGS. 4 and 5 are cross sectional views taken along the lines 4—4 and 5—5 respectively of FIG. 1;

FIG. 6 is a diagrammatic view of the apparatus; and

Figure 7:
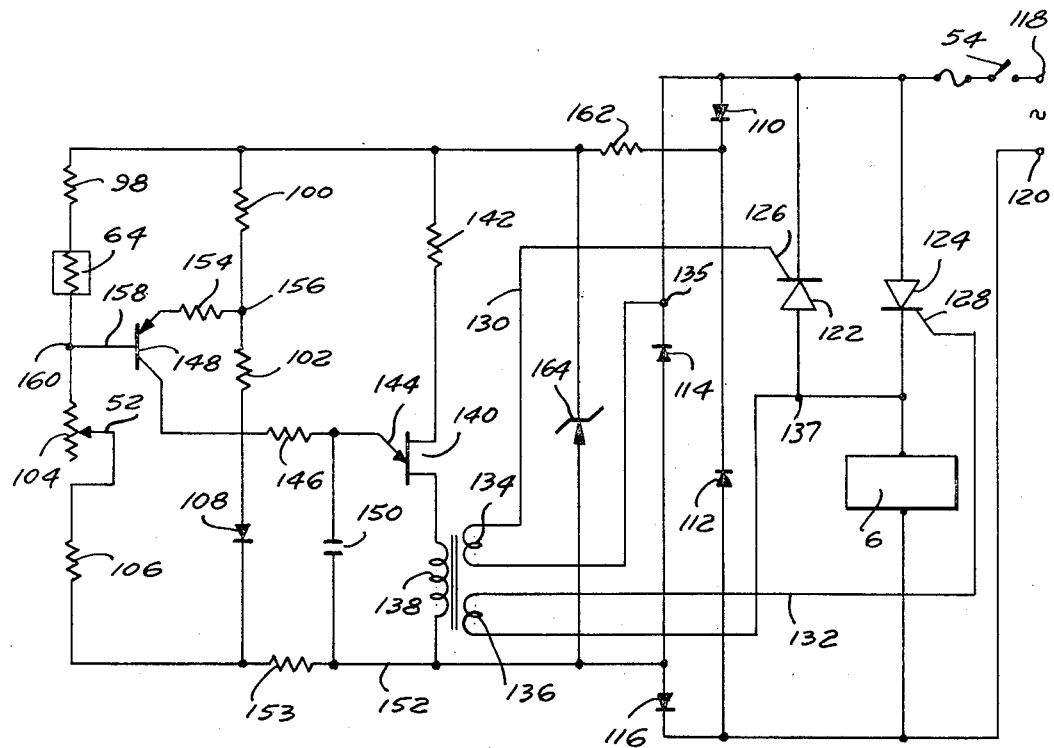

FIG. 7 is a circuit diagram of a typical temperature controlling circuit.

The apparatus comprises a support generally designated A and a heating chamber generally designated B, the latter being mounted on the former as a separate unit therefrom and preferably being adjustably positionable relative thereto by means of structure, generally designated C, described hereinafter more in detail. Removably received in the heating chamber B are one or more distilling tubes of novel design generally designated D, here shown as four in number. Means generally designated E are provided for conveying a supply of sweep gas to one end of the tubes D, and means generally designated F are provided, on the other side of the heating chamber from the means E, for conveying from the distilling tubes D the products of distillation. The means F, preferably in the form of flexible conduits, are led through a container G mounted on the support A, which container is adapted to hold a supply of cooling, and therefore condensing, material. Means H are provided on the support A for holding one or more receptacles I into which the ends of the conduit means F extend after leaving the condensing container G, the condensed distillants from the tubes D thus collecting in the receptacles I to which their respective conduit means F communicate.

The heating chamber B comprises a casing 2 of metal or the like having a heat-insulating lining 4 and provided on the inside thereof with an electrical heating element generally designated 6 (see FIG. 5). Pairs of registering openings 8 and 10 are formed in the front and rear walls 12 and 14 of the heating chamber B to define passages therethrough, the openings 8 and 10 being of a size such as to freely, and preferably snugly, receive a distilling tube D therein. Each tube D, as may best be seen from FIG. 5, comprises a tubular body 16, preferably formed of a suitable glass, having a length greater than the distance between the heating chamber walls 12 and 14 and of a size such as to be received within the openings 8 and 10 in those heating chamber walls 12 and 14. The tube body 16 is open at one end 18, and a rubber plug 20 is adapted to be sealingly received therein, that plug preferably having a relatively thin central septum or wall 22. Extending upwardly from the tube body 16 adjacent the end 18 thereof is a vertical tubular extension 24. The tube body 16, at its other end, is provided with a constricted tip 26. Each tube D is freely slidably through the heating chamber B, and is adapted to be retained in its operative position relative to the heating chamber B, as illustrated in FIG. 5, through engagement with a releasable holding means generally designated 28 mounted on the heating chamber B. As here specifically disclosed, means 28 comprises a spring clasp mounted on the front wall 12 of the heating chamber B, as by means of rivet 30, the upwardly extending tube portion 24 of a given distillation tube D being adapted to be releasably received between the resiliently spreadable arms of the clasp 28.

The support A comprises a casing 32 having a top wall 34 provided with an opening 36 within which the container G is received, that container being in the form of a deep tray adapted to contain a supply of cooling, and hence, condensing, material, such as the ice schematically shown in FIG. 4 and generally designated 38. The container 36 may be formed of a suitable heat-insulative material and may, if desired, be provided with an outer layer of thermal insulation, in order that the material 38 within the container should retain its low temperature for as long as possible. The container G is provided with a rim flange 40 adapted to rest on the upper surface of the top wall 34 of the casing 32, the container G thereby being readily removable from the support A for cleaning and refilling purposes.

The casing 32 comprises a front wall 42 on which a bracket 44 is mounted in any appropriate manner, that bracket comprising a forwardly extending wall with a plurality of notches 46 formed therein. The notches 46 are designed to receive the receptacles I, those receptacles comprising a body portion 48 with an enlarged rim flange 50, the body portion 48 being received inside a notch 46 while the rim portion 50, wider than the notch 46, rests on the wall 44, thus supporting the receptacle I but permitting its ready removal and replacement.

The energizing and control means for the heater element 6 within the heating chamber B is mounted for the most part on the support A. A control knob 52, an on-off switch 54, and a temperature-indicating dial 56 are all mounted on the front wall 42 of the casing 32 so as to be readily accessible. Located within the casing 32 is energizing and control circuitry such as that schematically disclosed in FIG. 7, and described more in detail hereinafter. Electrical connections are made between this control circuitry and the heating element 6, and in addition the heating chamber B is provided with another opening 58 (see FIG. 5) through which a probe 60 (see FIG. 1) is removably received, the probe 60 carrying elements 62 and 64, the element 62 being a temperature-sensing element which controls the temperature-indicating dial 56 and the element 64 being a temperature sensing element active within the circuitry of FIG. 7 so as to maintain the temperature within the heating chamber B at a desired value, as determined by the setting of the knob 52.

Figure 2:
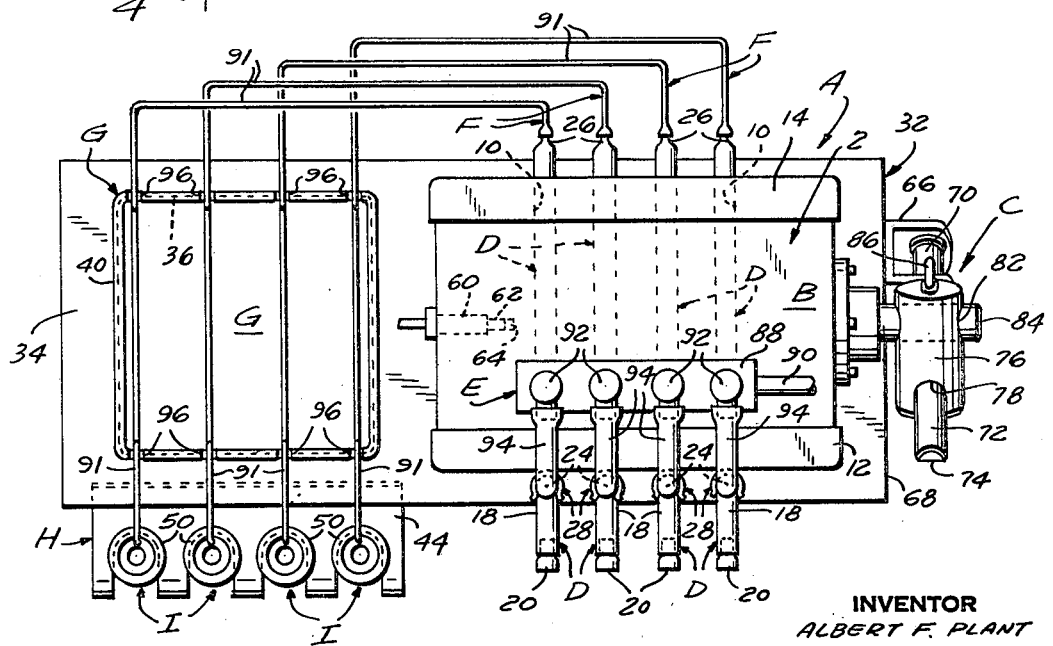
FIG. 2 is a top plan view thereof.

The means C by which the heating chamber B is adjustably positionable relative to the support A comprises, in the form here specifically disclosed, a bracket 66 mounted on a side wall 68 of the casing 32 within which rod 70 is received. As shown it is rotatable but not axially movable relative to the bracket 66. It has an upwardly extending portion 72 with a flat side 74. Mounted on the rod portion 72 is a collar 76 provided with an aperture 78 through which the flattened rod portion 72 is slidable, the collar 76 also being provided with an axially extending set screw 80 adapted to engage the flat side 74 of the rod extension 72. The collar 76 is also provided with a laterally extending circular opening 82 through which a shaft 84 is rotatably received, the shaft 84 being fixed to and extending laterally from the heating chamber B, preferably in a direction substantially perpendicular to the axis of the passages defined by the aligned pairs of apertures 8 and 10 in which the distilling tubes D are adapted to be received. The collar 76 carries a second set screw 86 which is adapted to engage the shaft 84. Thus the heating chamber B may be moved up and down with respect to the support A by loosening the set screw 80, sliding the collar 76 up or down along the rod extension 72, and then tightening the set screw 80. The heating chamber B may be rotated about the axis of the shaft 84, thereby tilting the distillation tubes D carried thereby, by loosening the set screw 86, rotating the heating chamber B, and with it the shaft 84, to desired degree, and then tightening the set screw 86. The heating chamber B is shown in FIGS. 1 and 2, and in solid lines in FIG. 3, in a position close to the support A and horizontal, feet 87 optionally provided on the chamber B resting on the top wall 34 of the support A. In this position the passages defined by the apertures 8, 10 are horizontal or substantially so. In broken lines in FIG. 3 the heating chamber B is shown in a position raised above that shown in solid lines and rotated relative thereto. In this position the passages defined by the apertures 8, 10 are inclined relative to the horizontal.

Mounted on the apparatus, and here shown mounted on the heating chamber B, is a manifold 88 adapted to be connected, by conduit 90, to a source of suitable sweep gas. The manifold 88 is provided with a plurality of adjustable valves 92, preferably one for each of the distillation tubes D, and a flexible conduit 94 is connected between each valve 92 and the upwardly extending tube portion 24 of the corresponding distillation tube D. This constitutes the means E for providing sweep gas to each tube D and for controlling the pressure, and hence the rate of flow, of that gas through the tube D. The means F connected to the constricted tips 26 of the distillation tubes D preferably comprise flexible tubing 91 which may readily be led to the condensing container G, where they are passed through the condensing material 38 (see FIG. 4), preferably being held in place by means of notches 96 formed in the rim flange 40. From there the conduits F are led into the collecting receptacles I.

The circuit disclosed in FIG. 7 represents one means by which the temperature within the heating chamber B may be held at a desired level. The temperature sensitive element 64 carried by the probe 60 is in the form of a thermistor the resistance of which will vary with the sensed temperature. It is connected in a bridge circuit with resistors 98, 100, 102, 104, 106, the resistor 104 being adjustably variable by means of the knob 52. A rectifier 108 is connected in the bridge circuit in series with the resistors 100 and 102. Power to the bridge circuit is provided from the full wave rectifier bridge comprising rectifiers 110, 112, 114 and 116, connected across AC input line terminals 118 and 120, the on-off switch 54 being provided in that circuit. The heating unit 6 within the heating chamber B is connected across the AC terminals 118 and 120 via silicon control rectifiers 122 and 124 having control terminals 126 and 128 respectively which are connected by leads 130 and 132 respectively to the appropriate ends of transformer secondary windings 134 and 136 respectively, the other ends of those secondary windings being connected to points 135 and 137 respectively. The primary winding 138 of that transformer is connected in series with the power terminals of unijunction transistor 140 and resistor 142. The control terminal 144 of the unijunction transistor 140 is connected by resistor 146 to the collector of amplifying transistor 148, and is connected by capacitor 150 to low potential bias lead 152. Resistor 153 is connected between the lower end of capacitor 150 and the lower end of the rectifier 108. The emitter of transistor 148 is connected by resistor 154 to point 156 between resistors 100 and 102. The base of transistor 148 is connected by lead 158 to point 160 between resistors 64 and 104. Power resistor 162 is connected between the upper end of resistor 142 and the full wave rectification bridge, and Zener diode 164 is connected between resistor 162 and the low potential bias lead 152.

The circuit of FIG. 7 functions as follows:

When the control knob 52 on the front wall 42 of the support A is set to a desired temperature, the resistor 104 is correspondingly adjusted. This sets up an unbalance in the rectifier bridge for so long as the temperature within the heating chamber B differs from that desired. This unbalance provides a signal to transistor 148, which signal is amplified thereby and controls transistor 140, the latter acting as a switch. The switching signal controlling the transistor 140 charges capacitor 150, and that capacitor 150 together with the resistor 153 constitute a timing circuit which determines how long transistor 140 will be conductive after each signal from transistor 148 which makes it conductive. As the transistor 140 becomes conductive and non-conductive, voltages will be induced in the secondary windings 134 and 136 which will control the on and off times of the silicon controlled rectifiers 122 and 124. These rectifiers, in turn, control the amount of current supplied to the heating unit 6. The length of time that the rectifiers 122 and 124 conduct, as compared with full half-cycle conduction, will control the energization of the heating unit 6 and hence the amount of heat generated thereby. Furthermore, the proportion of the maximum available time that those rectifiers 122 and 124 will conduct will be determined by the relation between the actual temperature within the chamber B, as sensed by the element 64, and the desired temperature therein, as controlled by the knob 52 which sets the value of the resistor 104.

To use the apparatus the requisite number of distillation tubes D are filled with a suitable inert filling 170 such as glass wool, which may readily be inserted through the wide end 18 of the tube body 16, after which the rubber plug 20 is put into place. This is done while the tubes D are separated from the fixed portion of the apparatus, at any convenient time and in any convenient location, where desired conditions of cleanliness can be maintained in optimum fashion. The thus prepared tubes D are then brought to the heating chamber B and inserted therein by being slid through the passages defined by the aligned pairs of openings 8, 10 until their constricted ends 26 extend beyond the rear wall 14 of the heating chamber B and their upwardly extending portions 24 are engaged and grasped by the holding means 28. All that is required to accomplish this is a simple insertion of the tube D within the chamber B. Thereafter the ends of the conduits 94 and 91 are secured respectively to the upper ends of the tube portions 24 and the constricted tube ends 26.

The receptacles I are put in place, the conduits F are positioned to extend through the condensing material 38 in the containers G and into the condensate-receiving receptacles I, and the device is ready to function.

The supply of sweep gas is provided to the manifold 88, and the flow of that gas through the individual tubes 10 is controlled by the valves 92. The switch 54 is closed, energizing the heating unit 6 and the control circuitry therefor, and the knob 52 is set to the desired temperature. At an appropriate time the specimen to be distilled is inserted into the tube D, as by means of a hypodermic needle which is caused to penetrate the septum 22 forming a part of the rubber plug 20. The specimen is deposited on the glass wool 170, sweep distillation takes place, and the distilled products are condensed in the container G and are carried by the sweep gas into the receptacles I.

After a given sweep distillation operation has been completed, the tubes D may be removed simply by disengaging them from the conduits 94 and 91 and pulling them out. Fresh tubes D may immediately be inserted, and the apparatus can then be used again for a new sweep distillation, without having to wait for the originally-used tubes D to be cleaned.

If the specimen contains comparatively heavy polymeric materials which should remain in the tube D and not reach the receptacle I, or if one wishes to separate high boiling materials from lower boiling point materials, or if for any other reason it is desired to increase the effective operative length of the tubes D which are subjected to distillation conditions, it is necessary only to adjust the relative position of the heating chamber B with respect to the support A in the manner described above, thereby to cause the operative lengths of the tubes D to be inclined rather than horizontal. Hence the effect of a physically longer tube D and a physically longer heating chamber B is achieved without any change in the actual physical dimensions of those parts.

Apart from the distilling tube D, only the heating chamber B is subjected to the high distillation temperatures, which may extend between 100°–400° C. As a result it is the heating chambers B which are most susceptible to malfunction. One heating chamber B may be removed and another put in its place merely by loosening the set screw 86, sliding the shaft 84 of the old heating chamber B out from the collar 76, and sliding the shaft 84 of the new heating chamber B thereinto, after which the set screw 86 is tightened.

As few or as many sweep distillation operations can be carried out simultaneously as may be desired, within the limits provided by the initial construction of the apparatus. Each tube D may feed a separate condensate-receiving receptacle I or, if desired for greater yield, samples of the same specimen could be introduced into two or more tubes D, and the conduits F connected thereto could all feed into the same receptacle I.

Thus it will be seen that the apparatus of the present invention is capable of highly effective use in connection with sweep distillation procedures, that its operation is simple, fast and easily adaptable to different operational requirements, that cleaning is greatly facilitated and the down-time of the apparatus virtually reduced to zero, and that a very high degree of accuracy may be achieved with exceedingly small clean-up levels as low as .025 parts per million.

While but a single embodiment of the present invention has been here specifically disclosed, it will be apparent that many variations may be made therein, all within the scope of the invention as defined in the following claims.

I claim:
1. A sweep distillation apparatus comprising a support including a casing, a heating chamber adjustably mounted on said support and having a plurality of passages therethrough, a distilling tube removably receivable in each of said passages and extending out beyond the side walls of said heating chamber, said tube having an inlet for introducing a sweeping gas at one end and a gas outlet at the opposite end thereof, flexible conduit means removably connected to said gas outlet, means for conveying a supply of sweep gas to the gas inlet end of each tube, releasable holding means mounted on the heating chamber for engaging and retaining each tube in position in said passage, condenser means comprising a container for cooling material mounted in the casing of said support, extension conduit means connected to said gas outlet conduit and passing through said condenser container, and distillate receptacle means mounted on said support casing adjacent to the condenser, said extension conduit means passing through the condenser container and into the distillate receptacle terminating near the bottom thereof for collecting said distillate.

2. The apparatus of claim 1, said heating chamber being adjustably articulately mounted on said support so as to be rotatable about an axis substantially perpendicular to the axis of said passage.

3. The apparatus of claim 1, said heating chamber being adjustably mounted on said support to as to be movable up and down relative to said support and be rotatable about an axis substantially perpendicular to the axis of said passage.

4. The apparatus of claim 1, in which said tube, at a portion thereof which extends out beyond said passage, has a part extending substantially at right angles to the axis of said tube proper, said tube holding means being engageable with said part to hold said tube in position.

5. The apparatus of claim 1, in which said tube, at a portion thereof which extends out beyond said passage, has a part extending substantially at right angles to the axis of said tube proper, said tube holding means being engageable with said part to hold said tube in position, said part comprising said gas inlet means.

6. The apparatus of claim 1 in which said tube, at a portion thereof which extends out beyond said passage, has a part extending substantially at right angles to the axis of said tube proper, said tube holding means being engageable with said part to hold said tube in position, said part comprising said gas inlet means, said tube extending out from the chamber beyond said part and there comprising a sample inlet means.

References Cited
UNITED STATES PATENTS

| | | | |
|---|---|---|---|
| 2,009,814 | 7/1935 | Podbielniak | 202—160 X |
| 2,222,464 | 11/1940 | Newman | 202—172 X |
| 2,718,493 | 9/1955 | Lawler | 202—172 |
| 2,894,881 | 7/1959 | Wolston et al. | 202—172 |
| 2,905,536 | 9/1959 | Emmett et al. | 23—232 |
| 2,909,469 | 10/1959 | Griffith | 202—172 X |
| 3,342,696 | 9/1967 | Bush | 202—172 |
| 3,356,458 | 12/1967 | Steinle et al. | 23—254 X |
| 3,345,272 | 10/1967 | Collins | 202—236 X |

FOREIGN PATENTS

| | | |
|---|---|---|
| 13,554 | 7/1933 | Australia. |
| 919,119 | 2/1963 | Great Britain. |

NORMAN YUDKOFF, Primary Examiner

F. E. DRUMMOND, Assistant Examiner

U.S. Cl. X.R.

23—254; 203—4